(12) United States Patent
Curcio

(10) Patent No.: US 6,414,629 B1
(45) Date of Patent: Jul. 2, 2002

(54) TRACKING DEVICE

(75) Inventor: Joseph A. Curcio, Gray, ME (US)

(73) Assignee: Tektrack, LLC, Gray, ME (US)

( * ) Notice: Subject to any disclaimer, the term of this patent is extended or adjusted under 35 U.S.C. 154(b) by 0 days.

(21) Appl. No.: 09/837,979

(22) Filed: Apr. 19, 2001

(51) Int. Cl.[7] .......................... G01S 5/02; H04B 7/185
(52) U.S. Cl. ................................................. 342/357.08
(58) Field of Search ...................... 342/357.08, 357.07, 342/357.09, 357, 14

(56) References Cited

U.S. PATENT DOCUMENTS

| | | | |
|---|---|---|---|
| 5,344,105 A | 9/1994 | Youhanaie | 244/3.14 |
| 5,379,045 A | 1/1995 | Gilbert et al. | 342/357 |
| 5,389,934 A | 2/1995 | Kass | 342/357 |
| 5,488,559 A | 1/1996 | Seymour | 364/449 |
| 5,502,446 A | 3/1996 | Denninger | 342/357 |
| 5,554,994 A | 9/1996 | Schneider | 342/357 |
| 5,589,835 A | 12/1996 | Gildea et al. | 342/357 |
| 5,629,678 A | 5/1997 | Gargano et al. | 340/573 |
| 5,689,269 A | 11/1997 | Norris | 342/357 |
| 5,702,070 A | 12/1997 | Waid | 244/183 |
| 5,739,785 A | 4/1998 | Allison et al. | 342/357 |
| 5,752,218 A | 5/1998 | Harrison et al. | 701/207 |
| 5,781,150 A | 7/1998 | Norris | 342/357 |
| 5,784,339 A | 7/1998 | Woodsum et al. | 367/134 |
| 5,852,401 A | * 12/1998 | Kita | 340/521 |
| 5,923,294 A | 7/1999 | Bacelon et al. | 342/457 |
| 6,040,766 A | 3/2000 | Lübke et al. | 340/438 |
| 6,043,777 A | 3/2000 | Bergman et al. | 342/357.09 |
| 6,049,304 A | 4/2000 | Rudel et al. | 342/357.08 |
| 6,327,535 B1 | * 12/2001 | Evans et al. | 342/357.09 |

FOREIGN PATENT DOCUMENTS

EP 0 524 771 A3 1/1993

* cited by examiner

Primary Examiner—Thomas H. Tarcza
Assistant Examiner—Fred H Mull
(74) Attorney, Agent, or Firm—Banner & Witcoff, Ltd.

(57) ABSTRACT

A tracking system includes a target unit having a GPS receiver, a signal transmitter to send a signal including a position of the target unit; and a processor to calculate an optimal time interval for transmission of the signal. A locating unit has a GPS signal receiver, a compass to provide a reference direction of the locating unit, a signal receiver to receive the signal sent by the transmitter of the target unit, a processor to calculate a range and bearing from the locating unit to the target unit, and an indicator to display the range and bearing. In certain preferred embodiments, the processor calculates a confidence level indicating the reliability of the signal being sent.

82 Claims, 6 Drawing Sheets

TRACKING DEVICE

INTRODUCTION

The present invention is directed to a tracking device, and, more particularly, to a device for tracking an individual or an object, having improved reliability.

BACKGROUND

Personal tracking devices have been found to be extremely useful in locating lost objects and, more importantly, missing persons. Such tracking devices typically use a network of Global Positioning Satellites (GPS) in low earth orbit that broadcast precise timing signals from on-board atomic clocks. Using triangulation formulas, a device that picks up signals from several satellites simultaneously can determine its position in global coordinates, namely latitude and longitude.

A device with a GPS receiver has a 24 hour a day line-of-sight view to a sufficient number of satellites at any spot on the earth such that a person with a GPS receiver is able to determine their own longitude and latitude to within several meters, as well as their elevation. However, the fact that an individual knows their own position in longitude and latitude does not help others find them without extremely precise topographical or geophysical maps, which also show longitude and latitude. Furthermore, the degree of precision in position determination is then only accurate to the resolution of the maps on hand and to the degree of accuracy provided by the GPS hardware.

Dead-reckoning is well known as a method of guiding ships, whereby the known velocity and direction of travel of a ship from a known position is used to calculate the current position of the ship. However, the further the ship moves away from the known position, the less accurate the dead-reckoning position becomes. Adverse weather conditions can also erode the accuracy of navigation by dead-reckoning.

With a GPS receiver and a very accurate map, a ship can be guided with a suitable degree of precision. However, due to the possibility of military uses of the GPS system by adversaries, the GPS timing signals broadcast by the satellite network for commercial use are intentionally made less accurate than GPS signals that are encoded for military uses. These timing and position errors are known as Selective Availability (SA), and reduce the accuracy of civilian users of the GPS signals. This reduced accuracy may not be suitable for tracking objects and individuals, and, therefore, can erase the benefits of the GPS technology.

U.S. Pat. No. 5,781,150 to Norris discloses a tracking device having an RF transmitter and an RF receiver, each of which have a built-in GPS receiver. The transmitter sends its GPS position via an RF signal to the receiver, which in turn calculates the position of the transmitter relative to that of the receiver. The receiver then displays range and bearing information regarding the transmitter's location with respect to the receiver.

Norris is limited in that such a device provides no information regarding the reliability of the RF signal sent. Additional problems are encountered when using such a GPS system in a man-overboard situation. A radio transmitter that relies on "line of sight" from its antenna to a receiver for reliable transmission is subject to potential signal loss when operated at the surface of the sea. Waves can obscure the direct line of sight of the antenna, and may tend to submerge the transmitting antenna. This is particularly true for a transmitter that is worn or carried by a person floating on the surface of the water. Transmission of a signal, such as an RF signal, can be obscured by waves, and the transmitter can be subject to immersion, resulting in wasted energy and signal loss. This results in shortened transmitter battery life and decreased transmission reliability.

It is an object of the present invention to provide a tracking device that reduces or wholly overcomes some or all of the difficulties inherent in prior known devices. Particular objects and advantages of the invention will be apparent to those skilled in the art, that is, those who are knowledgeable or experienced in this field of technology, in view of the following disclosure of the invention and detailed description of preferred embodiments.

SUMMARY

The principles of the invention may be used to advantage to provide a tracking device for locating lost individuals or objects that can increase the chances that a signal sent by a transmitter of the lost object is received by a device tracking the lost object. Additional embodiments of the present invention can provide an increased level of confidence that the location indicated for the individual or object is accurate.

In accordance with a first aspect, a tracking system includes a target unit having a GPS receiver, a signal transmitter to send a signal indicating a position of the target unit, and a processor to calculate an optimal time interval for transmission of the signal. A locating unit has a GPS signal receiver, a compass to provide a reference direction of the locating unit, a signal receiver to receive the signal sent by the transmitter of the target unit, a processor to calculate a range and bearing from the locating unit to the target unit, and an indicator to display the range and bearing.

In accordance with a second aspect, a tracking system includes a target unit having a GPS receiver and a signal transmitter to send a signal indicating a position of the target unit. A locating unit has a GPS signal receiver and a compass to provide a reference direction of the locating unit. A signal receiver receives the signal sent by the transmitter of the target unit. A processor calculates a range and bearing from the locating unit to the target unit and a confidence level to indicate a reliability of the signal sent by the target unit. An indicator displays the range, bearing and confidence level.

In accordance with another aspect, a system to transmit the location of an object or individual associated with the system includes a GPS receiver to determine a position of a device. A signal transmitter sends a signal indicating the position of the device. A processor calculates an optimal time interval for transmission of the signal.

In accordance with yet another aspect, a tracking system to track the location of an object in water includes a target unit having a GPS receiver to determine a position of the target unit. A sensor detects motion of the target unit, and a processor calculates when the target unit is proximate a crest of a wave. A signal transmitter sends a signal indicating the position of the target unit when the target unit is proximate the crest of a wave. A locating unit has a GPS signal receiver and a compass to provide a reference direction of the locating unit. A signal receiver receives the signal sent by the transmitter of the target unit. A processor in the locating unit calculates a range and bearing from the locating unit to the target unit. An indicator displays the range and bearing from the locating unit to the target unit.

In accordance with a further aspect, a method of tracking a target unit from a locating unit includes the steps of receiving a GPS signal at a target unit to determine a location of the target unit, receiving a GPS signal at a locating unit tracking the target unit to determine a location of the locating unit, calculating an optimal time interval for transmission of a signal from the target unit to the locating unit, where the signal includes the GPS location of the target unit, transmitting the signal from the target unit to the locating unit during the optimal time interval, and calculating a range and bearing from the locating unit to the target unit.

In accordance with yet a further aspect, a tracking system includes a tracking unit having a GPS receiver and a signal transmitter to send a signal including a position of the tracking unit. A signal receiver is configured to receive a signal sent by a transmitter of at least another tracking unit. A processor is configured to calculate a range and bearing from the tracking unit to at least another tracking unit and a confidence level attributed to a signal sent by at least another tracking unit. A compass provides a reference direction of the tracking unit, and an indicator is configured to display the range and bearing to at least another tracking unit.

From the foregoing disclosure, it will be readily apparent to those skilled in the art, that is, those who are knowledgeable or experienced in this area of technology, that the present invention provides a significant advance. Preferred embodiments of the tracking device of the present invention can provide increased reliability of signal transmission from a transmitter to a receiver, and increased confidence in the accuracy of the signal being sent. These and additional features and advantages of the invention disclosed here will be further understood from the following detailed disclosure of preferred embodiments.

BRIEF DESCRIPTION OF THE DRAWINGS

Preferred embodiments are described in detail below with reference to the appended drawings.

Figure 1:
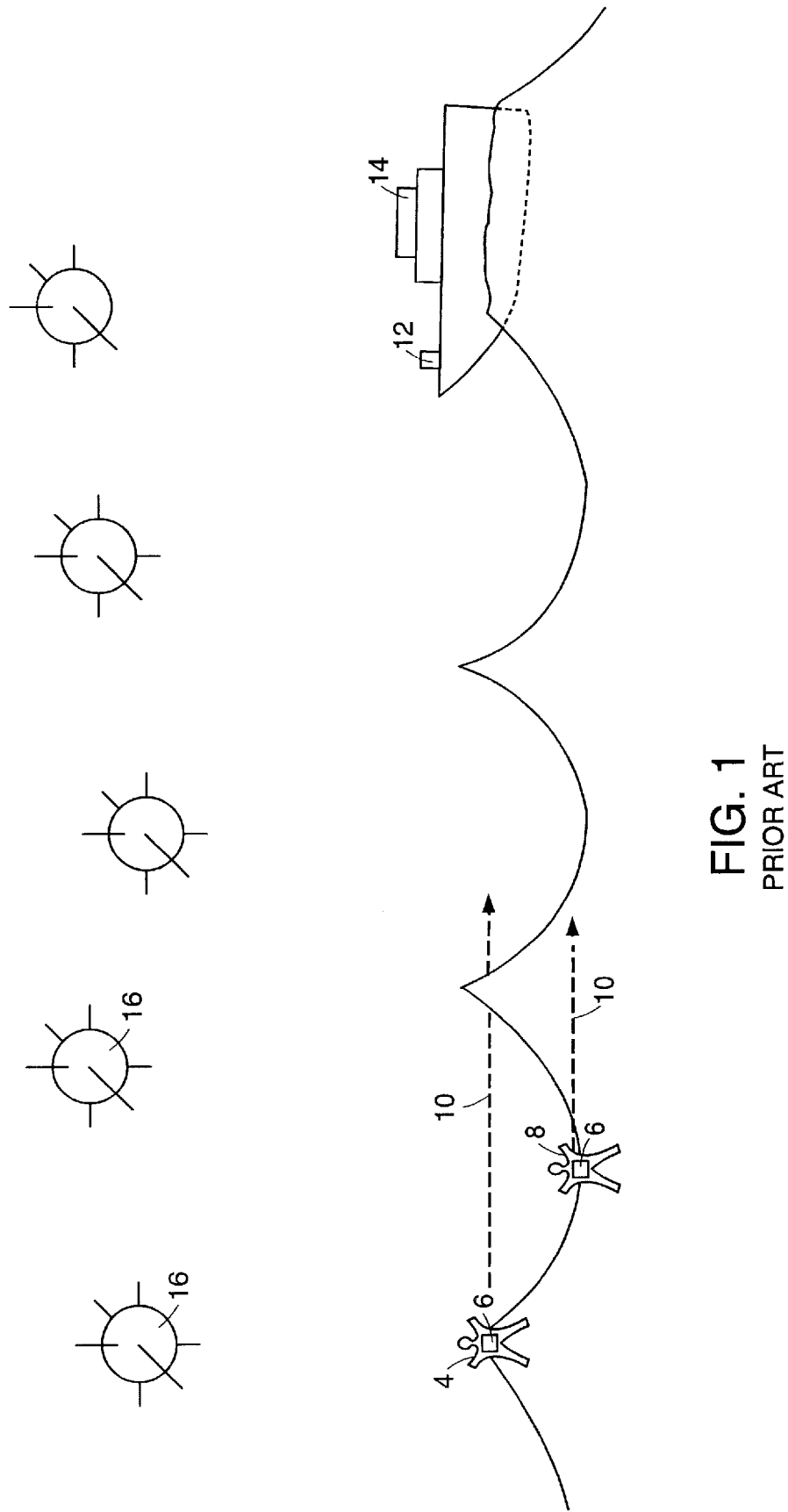
FIG. 1 is a schematic representation of a prior art personal tracking system shown in use in a man-overboard situation.

The figures referred to above are not drawn necessarily to scale and should be understood to present a representation of the invention, illustrative of the principles involved. Some features of the tracking device depicted in the drawings have been enlarged or distorted relative to others to facilitate explanation and understanding. The same reference numbers are used in the drawings for similar or identical components and features shown in various alternative embodiments. Tracking devices as disclosed herein, will have configurations and components determined, in part, by the intended application and environment in which they are used.

DETAILED DESCRIPTION OF PREFERRED EMBODIMENTS

A prior art personal tracking device 2 is shown in FIG. 1 in a man-overboard situation. A first individual 4 having a GPS device 6 is shown at the crest of a wave. A second individual 8 having a GPS device 6 is shown at the trough of a wave. GPS devices 6 include a transmitter that sends a signal 10, e.g., an RF signal, to a GPS device 12 on a ship 14. GPS device 12 has a receiver to receive the signals 10 sent by GPS devices 6. Each of the GPS devices ascertains its longitudinal and latitudinal position by acquiring signals from GPS satellites 16 that orbit the earth. A problem with such a prior art tracking device is that much of the signal 10 transmitted by second individual 8 is obstructed by waves. Additionally, the signal can further be diminished when the individual and their transmitter are submerged.

Figure 2:
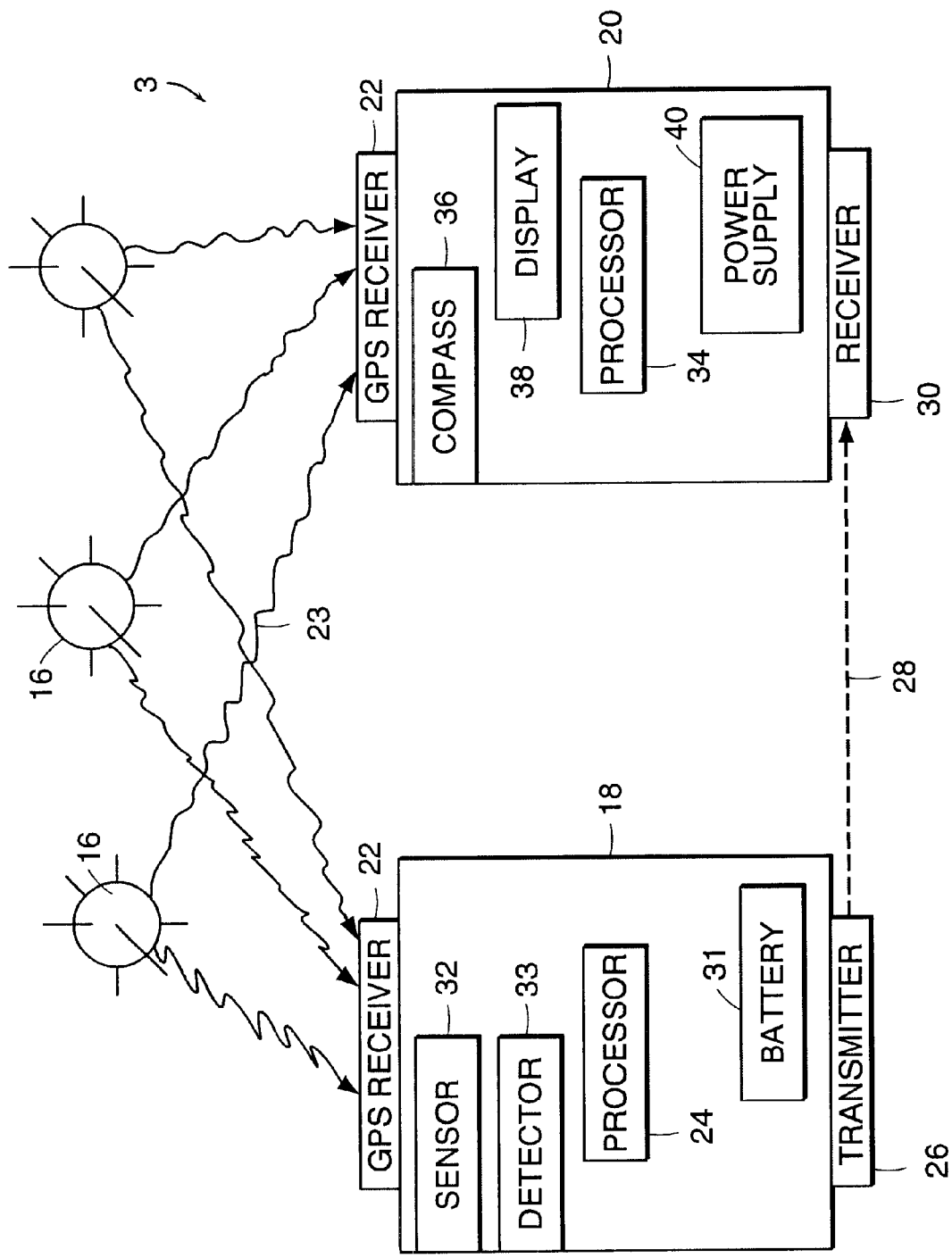
FIG. 2 is a block diagram showing the components of a personal tracking system in accordance with the present invention.

A tracking system 3 in accordance with a preferred embodiment of the present invention is shown in FIG. 2. Tracking system 3 includes a target unit 18 and a locating unit 20. Target unit 18 is associated with the object or person to be located, while locating unit 20 is used to search for and locate the target unit. Target unit 18 and locating unit 20 each have a GPS receiver 22 that receives signals 23 sent by GPS satellites 16. Target unit 18 has a processor 24 that calculates its position using known triangulation and/or quadrangulation techniques based on signals 23 received from GPS satellites 16. A transmitter 26 of target unit 18 sends a signal 28 to a receiver 30 of locating unit 20 indicating the position of target unit 18. Signal 28 may be, for example, an RF, an IR, a VHF signal, or any other suitable line of sight signal. Target unit 18 is typically powered by a battery 31.

In certain preferred embodiments, locating unit 20 can track multiple target units 18. In such a case, signal 28 from target unit 18 may include an identifier, e.g., a serial number, unique to that particular target unit, so that locating unit 20 can differentiate between different target units. Alternatively, signal 28 can be transmitted on a preselected frequency, known by locating unit 20 to be associated with that particular target unit. Other methods of identifying a signal 28 associated with a particular target unit 18 will become readily apparent to those skilled in the art, given the benefit of this disclosure.

Figure 7:
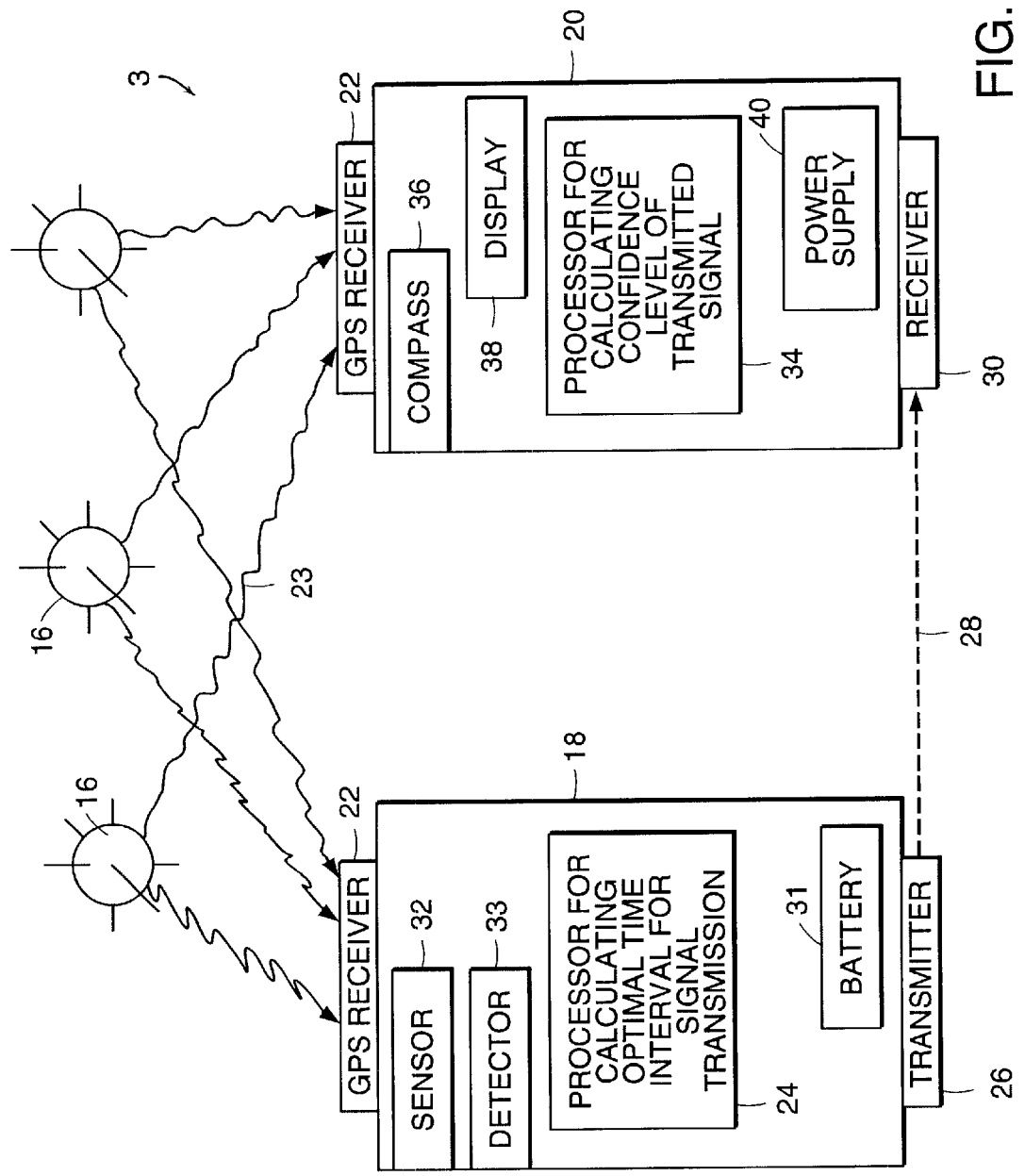
FIG. 7 is a block diagram showing the components of a personal tracking system in accordance with a further alternative embodiment of the present invention.

Since target unit 18 has no way of knowing if signal 28 is being received by a locating unit 20 or is falling on deaf ears, target unit 18 preferably sends signal 28 during times of predicted high reliability for transmission of the signal, in order to conserve battery power and improve the reliability of the tracking system. In certain preferred embodiments, target unit 18 has a sensor 32 that provides data regarding the motion of target unit 18. Processor 24 uses the data from sensor 32, and through the use of an algorithm determines a time of predicted high reliability for the transmission of signal 28, as illustrated in FIG. 7. In a preferred embodiment, sensor 32 is an accelerometer that provides data regarding the instantaneous acceleration of the targeting unit and its direction of travel. An accelerometer can be used, for example, when target unit 18 is floating on the surface of a body of water, such as in a man-overboard rescue scenario. In such a scenario, not only will target unit 18 move with the wind and currents, it will also ride up and down along the surface of waves. Processor 24, therefore, can use inertial data from the accelerometer to determine when target unit 18 is at or near the crest of the wave, thereby determining an optimal time interval for transmission of signal 28 to receiver 30. In this manner, the transmission of signal 28 is much more likely to be received by locating unit 20 than if signal 28 was sent when target unit 18 is at the bottom, or near the bottom, of the trough of the wave.

This transmission process is known as parametric filtering with dynamic tuning, since target unit 18 relies on sensing components, e.g., sensor 32, to improve the reliability of transmissions, and this tuning of the transmission process is done continuously on a real-time basis by processor 24. Thus, target unit 18 knows where it is at all times through data from GPS receiver 22, and also knows where it is heading and how fast it is moving in a given direction through data from sensor 32.

In certain preferred embodiments, target unit 18 could incorporate additional information in signal 28 in addition to the instantaneous location of target unit 18. Processor 24 could incorporate historical information in signal 28 including, for example, location, drift direction and velocity of target unit 18 over a certain prior period of time. This type of historical vector information regarding the path that target unit 18 has traveled over a selected time period can be used by locating unit 20 to enhance the reliability of the system. Further, processor 24 could calculate a projected drift path over time based on its recently acquired position information and the historical information collected, and incorporate this projection in signal 28.

It is to be appreciated that the data received from GPS satellites 16 may be accurate enough to be used to determine times of predicted high reliability. For example, if the GPS data is accurate enough, processor 24 could use that data to predict when target unit 18 is at or near the crest of a wave, and send signal 28 at that time. In this case, processor 24 could calculate times of predicted high reliability without the use of additional components such as sensor 32.

In certain preferred embodiments, target unit 18 includes a water detector 33. When target unit 18 encounters water, e.g., when an individual falls into a body of water off a ship, water detector 33 senses the water and activates processor 24, which in turn sends signal 28 from transmitter 26 as described above. Thus, in a man-overboard situation, the processor is only activated upon entry into water, thereby conserving battery power.

The use of water detector 33 is particularly useful in a situation where an individual wearing a target unit 18 falls overboard from a vessel having locating unit 20. When processor 24 is initially activated, GPS receiver 22 takes some time to initialize, and, therefore, cannot include a location in the first signal it transmits upon entry into the water. Accordingly, signal 28 preferably includes the identifier unique to that target unit. This allows processor 34 of locating unit 20 to commence tracking of this particular target unit 18 upon receiving the initial signal from target unit 18. Since GPS receiver 22 of locating unit 20 is typically powered on at all times, processor 34 knows its position, and, therefore, the position of target unit 18 at the time of activation. This provides a starting point location for the search.

Water detector 33 may be any type of detector that can detect when the target unit is in water, such as a detector that activates an electrical contact upon coming into contact with water, a pressure detector, or a combination of both. Other suitable water detectors will become readily apparent to those skilled in the art, given the benefit of this disclosure.

It is to be appreciated that signal 28 can also include, in addition to the location of target unit 18, an identifier unique to that target unit 18. Signal 28 could also include other types of data and voice. For example, medical information regarding an individual wearing target unit 18 could be included in signal 28, providing users of locating unit 20 constant updates on the lost individual's medical condition. Additionally, transmission of data from various target units, including their location, health status, etc., can be relayed in a network configuration, as described further below.

Locating unit 20 has a processor 34 that calculates its position using known triangulation and/or quadrangulation techniques based on signals 23 received from GPS satellites 16. Locating unit 20 also has an electronic compass 36. Processor 34 then is able to calculate the position of target unit 18 relative to locating unit 20, through a differential GPS measurement, and provide range and bearing information indicating the position of target unit 18 with respect to locating unit 20. By providing relative range and bearing information based on a differential GPS measurement, the absolute error of the location of target unit 18 created by the SA induced error component of the GPS system is cancelled out. Relative range and bearing is more useful than an absolute location in a man-overboard rescue scenario, where the rescuers are primarily interested in knowing the distance and direction to the person in the water.

Figure 3:
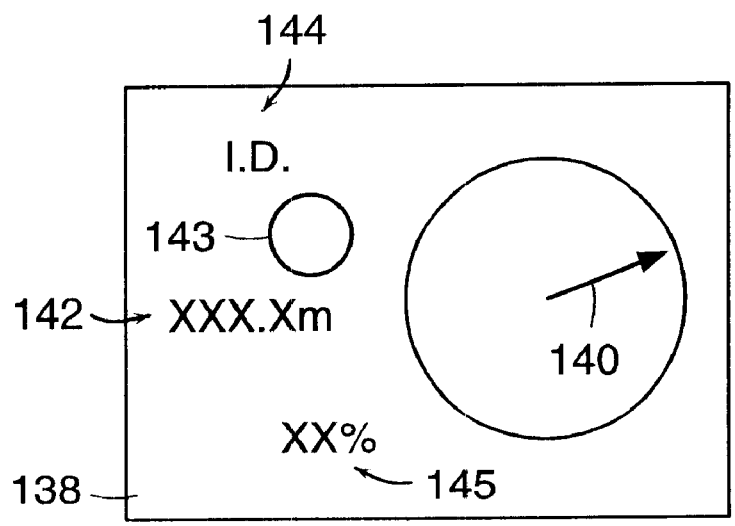
FIG. 3 is a plan view of a preferred embodiment of a graphical display of the personal tracking system of FIG. 2.

Locating unit 20 is powered by power supply 40, which may be an AC circuit, a battery, or other suitable power source. Locating unit 20 also has a display 38 that provides a visual indicator of the range and bearing to target unit 20. A preferred embodiment of a display 138 is shown in FIG. 3. Display 138 provides a user with a visual indicator of the direction toward target unit 18 from the user's vantage point, along with distance information. Display 138 may be an LCD display, or any other type of display suitable for displaying graphics and text. In this preferred embodiment, the range and bearing information is displayed through the use of an arrow 140 that always points in the direction of target unit 18, and text 142 listing the distance to target unit 18 in a suitable unit of measure, e.g., meters, yards, etc. Compass 36 in locating unit 20 ensures that arrow 140 will always point in the proper direction, that is, toward target unit 18. Display 138 may also provide a unit identifier 144 in text form, identifying the target unit in question when multiple target units are being tracked. In an additional preferred embodiment, the use of voice synthesis software in processor 34 and a speaker 143 in display 138 will provide constantly updated range, bearing and other data information to a user without requiring the user to constantly look at a monitor.

In certain preferred embodiments, as illustrated in FIG. 7, processor 34 calculates a value for the reliability or quality of the transmission of signal 28, referred to herein as a confidence level or confidence index. Confidence level 145 provides a user with information from which they can gauge the accuracy of the range and bearing information displayed. That is, the confidence level is a derived indicator that predicts to a user how accurately the range and bearing information displayed reflects the actual data calculated by target unit 18. Confidence level 145 may be displayed as a percentage, e.g., 95%, or as an integer value in a range, e.g., from 1 to 10. Confidence level 145 can be calculated in different ways. Calculation of the confidence level can be done solely by processor 34 of locating unit 20, or in conjunction with processor 24 of target unit 18. Accuracy of the confidence level is enhanced by having calculations done by processor 24, however, battery power is consumed more quickly the more processor 24 is used. For example, target unit 18 can send data regarding its calculated position with respect to a wave, which can be used by processor 34 in calculating the confidence level. Additionally, as signals are received and processed by locating unit 20, processor 34 can learn by analyzing the cumulative data from all the signals that have been received. Processor 34 can compare data received in a signal with predictions it has made about the location and/or direction and rate of travel of target unit 18 in order to evaluate the quality of the signal. Clearly erroneous signals are given very low confidence levels, while signals that are in concert with predictions made by processor 34 and previous signals sent by target unit 18 are given higher confidence levels. Thus, in a search operation, the confidence level will affect the error range or the +/− range associated with a plotted location of the target unit 18. Therefore, in a man overboard situation where the confidence level is low, searchers would be inclined to search a wider area for the lost individual. When a confidence level is high, however, searchers would be inclined to move to a pinpointed plotted location on a more direct route at a higher speed in an attempt to save valuable rescue time.

In other preferred embodiments, confidence level 145 can be enhanced by including a test signal in signal 28, known and understood by both target unit 18 and locating unit 20. Thus, if locating unit 20 receives a signal 28, and the signal includes a complete test signal, locating unit 20 will assign a high confidence level to that signal. The test signal can be equivalent to an eye test or hearing loss test tone. For example, if a sweep tone in discrete transmission power steps is incorporated in signal 28, locating unit 20 can evaluate the tone and capture the highest acceptable step of the transmission. This will establish a quantitative factor representing the strength of the transmitted signal, which can be translated into a displayed confidence level. In other preferred embodiments, the sweep tone could be sent at specific time intervals, e.g., every sixty seconds, and locating unit 20 can calculate the confidence level based on the frequency and level of acceptable signals received.

In certain preferred embodiments, signal 28 can include a variable indicating a projected time of the next transmission of a signal 28, or a frequency of transmission variable. Locating unit 20 can then use this information to evaluate subsequent signals 28 received in order to assist in determining whether signals 28 have been lost over a particular time period.

At certain times, target unit 18 may be unable to obtain a valid GPS signal. In such instances, processor 24 can perform dead reckoning using the data from sensor 32 and the last known position of target unit 18. The location transmitted in signal 28 in such a case is, therefore, less accurate than a GPS-based location. Consequently, it is desirable that the confidence level calculated by processor 34 of locating unit 20 takes into account that the location of target unit 18 was produced by dead reckoning. Thus, in certain preferred embodiments, signal 28 includes an indication that its location is based on dead reckoning so that the confidence level is calculated properly.

The algorithm or algorithms used to produce a confidence level constantly evaluate all data received from target unit 18 in order to assign a confidence level to a particular signal. In addition to displaying this confidence information, the processing software can be empowered to make a determination of whether or not to continue to obtain updated data information from slave devices. In this manner, battery power can be further conserved. Software can also be utilized to generate range and bearing predictions (i.e. the software can analyze drifting trends, etc.) in order to fill in the data blanks that arise from poor data transmission and low confidence factors. In this manner, the system can maintain an ongoing display of a man overboard position, even during periods of low signal transmission.

Figure 4:
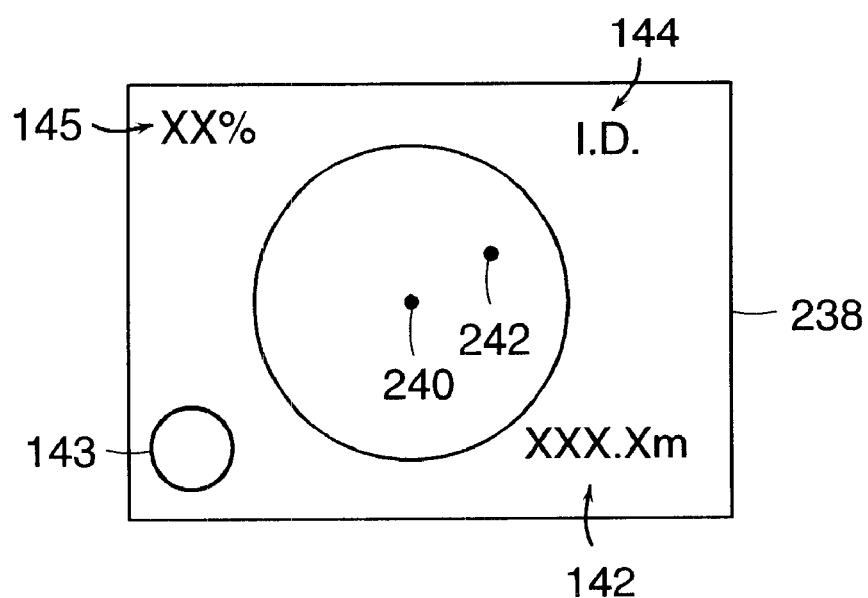
FIG. 4 is a plan view of an alternative embodiment of a graphical display of the personal tracking system of FIG. 2.

Another preferred embodiment of a display 238 is shown in FIG. 4, where display 238 is a graphical display that shows the location of target unit 18 as compared to that of locating unit 20. In the illustrated embodiment, display 238 takes the form of a circular display like that of a radar screen, with a center point 240 on the display representing the location of locating unit 20, and a moving point 242 representing the location of target unit 18 relative to center point 240. Display 238 also provides text 142 listing the distance to target unit 18, and confidence level 145.

In certain preferred embodiments, the location information with respect to target unit 18 may be presented in an alternative format to reflect the respective confidence level associated with that data. The range and bearing information, as seen in FIG. 3, may be represented, e.g., as a dashed line, a colored line, a wider line, a fuzzy line, or any other obvious variation. With respect to the display depicted in FIG. 4, point 242 may be represented by a different color, a circle of varying diameter, a cross-hair of varying size, a fuzzy point, or any other obvious variation to help reflect the confidence level associated with that data point. This type of alternative representation provides searchers with a visual indicator that can help them determine the width and breadth of the search area.

Figure 5:
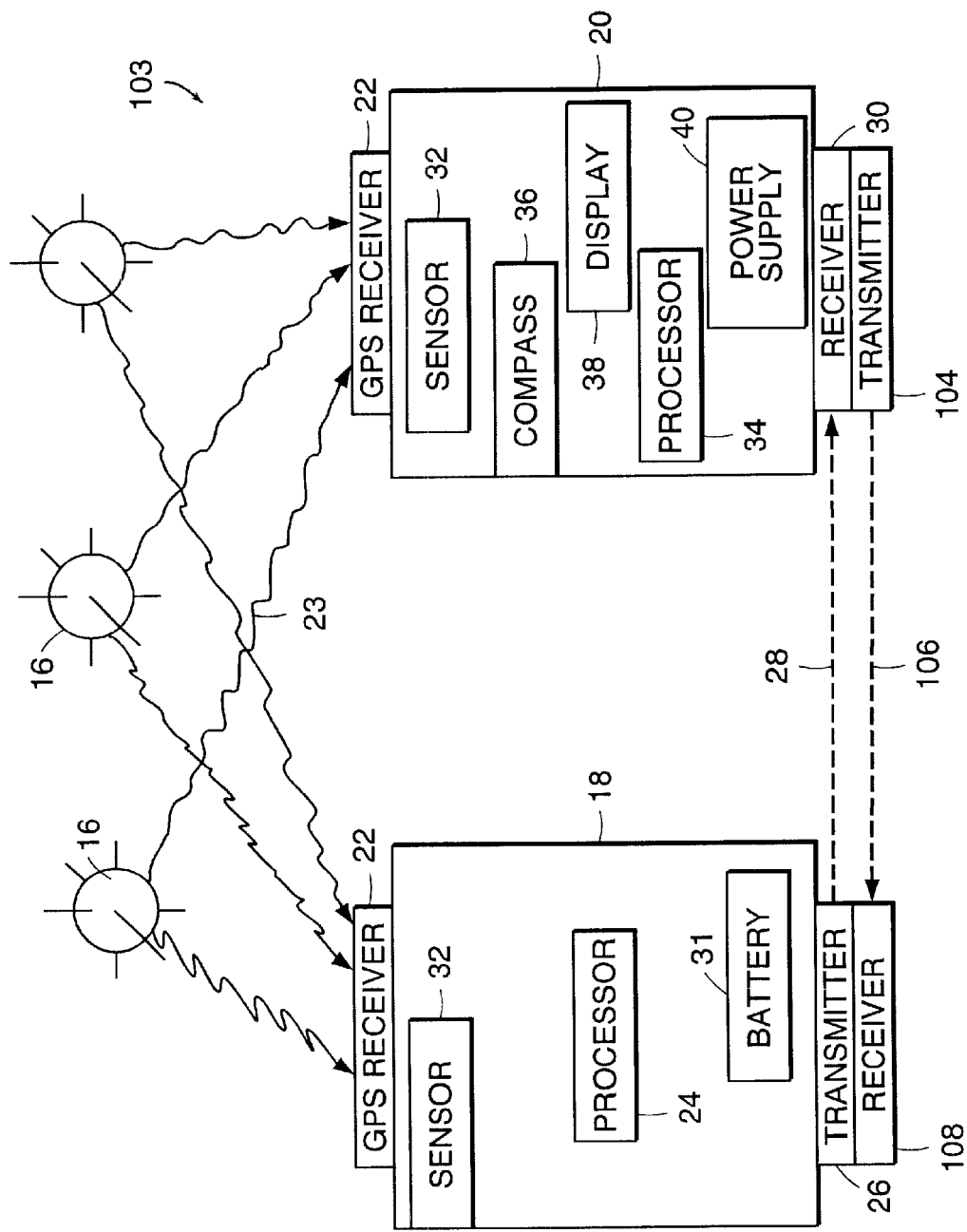
FIG. 5 is a block diagram showing the components of a personal tracking system in accordance with an alternative embodiment of the present invention.

Another preferred embodiment of a tracking device 103 is shown in FIG. 5, where a transmitter 104 is provided on locating unit 20 to send a signal 106 to a receiver 108 on target unit 18. Signal 106 can include information such as signal strength, error checking data, and other confirmation data. Since target unit 18 has the benefit of knowing that locating unit 20 has received signal 28, target unit 18 can further conserve battery power by limiting its transmissions. Processor 24 can interpret the data received from locating unit 20 regarding the strength and reliability of a previously sent signal, compare these results with its projection regarding the optimal time interval for sending that particular signal, and modify its algorithm for calculating optimal transmission times accordingly. Thus, processor 24 can learn from its environment the best method to reliably transmit data. Such an embodiment can enhance the accuracy of the confidence level calculations, since both processors can compare data to determine how accurate a particular transmitted signal is.

Further utility of the aforementioned parametric filtering with dynamic tuning method of improved radio transmission is achieved in the transmission of a broad range of communication methodologies. For example, VHF radio transmission while operating on the surface of the sea can be enhanced through employment of the described technique. Additionally, the utilization of two-way communications between transmission stations can further improve signal reliability through the utilization of the confidence level described above. For example, the addition of packets of test data to the regular transmission of signals between stations can allow for error detection and a determination of signal reliability. This information can then be displayed or otherwise used, i.e., incorporated into a software algorithm in the processor, in conjunction with the data itself in order to assign a degree of confidence to the data. In this manner, radio transmissions on sea and on land can be tested and graded automatically by processor software intrinsic to the radio devices themselves.

In other preferred embodiments, multiple units can be networked together, with the locating unit and each target including a transmitter and receiver, as seen in FIG. 5, such that each unit is capable of receiving data from any other unit in the network. In addition, each unit's processor would include software specific to ascertaining a confidence level to measure the quality, strength, or reliability associated with transmissions, as well as the computation and display (or voice synthesis relay) of data relative to multiple unit locations and conditions in real time.

In certain preferred embodiments, locating unit 20 may also include a sensor 32, such as an accelerometer. This will allow locating unit 20 to monitor its movement, and, therefore, perform dead reckoning. Therefore, in a networked environment with multiple target units, all the units that are not receiving accurate GPS data can update their instantaneous location by communicating with other units that are receiving accurate GPS data. This could be particularly useful in a situation where certain units are indoors and others outdoors. The outdoor units can then aid in refining the perceived dead reckoning-based location of indoor units.

In addition, the incorporation of multiple radio (slave) units into a network that utilizes an algorithm to calculate a confidence level, along with the dynamic tuning circuitry described here, further enhances the overall system reliability of the described method of providing tracking information in a situation where multiple targets are being tracked. This is accomplished by allowing any device to act as a relay of data to any other device within the network. By allowing real time software to process the accelerometer information in each node of the network and by determining in real time the best possible time to transmit data within the network, the entire network benefits from the dynamic tuning effect and is capable of maintaining in real time an overall system, or network, confidence level. This feature, that is, the networked application of real time dynamic tuning and assignment of a confidence level has implications that provide utility to a broad range of communication methodologies.

Figure 6:
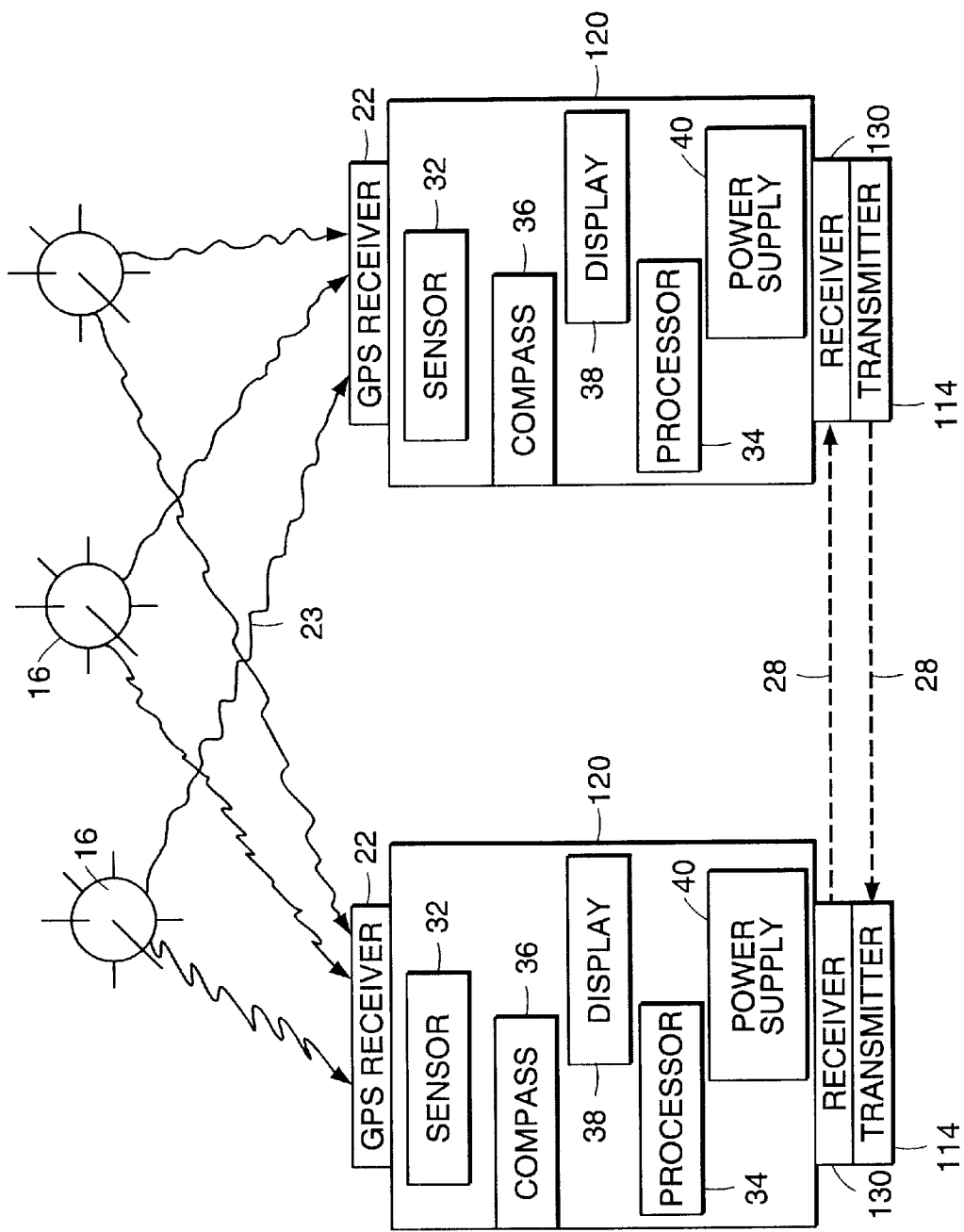
FIG. 6 is a block diagram showing the components of a personal tracking system in accordance with yet another alternative embodiment of the present invention.

Another preferred embodiment is shown in FIG. 6, where a plurality of tracking units 120 are used in a network type configuration. Only two tracking units 120 are shown here for purposes of clarity, but it is to be appreciated that any number of tracking units 120 may communicate with one another in such an environment. Each tracking unit 120 has a GPS receiver 22 to determine its location and an electronic compass 36. Sensor 32, preferably an accelerometer, provides data regarding the motion of tracking unit 120 and, therefore, allows each tracking unit to determine its location by dead reckoning when no GPS signal is available. Power supply 40 may be any suitable source of power, but is preferably a battery so that tracking unit 120 can be used anywhere without the need to be directly tied in to a source of power. Display 38 is used to display the range and bearing to other tracking units 120, as well as display the confidence level calculated by processor 34 with respect to signals that are received from the other tracking units. Transmitter 114 and receiver 130 transmit and receive, respectively, signals 28 exchanged between each of the tracking units 120. Accordingly, tracking unit 120 can send a signal to, and receive a signal from, each of the other tracking units 120. In a man overboard embodiment, each tracking unit can also include a water detector (not shown here, but seen above in connection with FIG. 2). Thus, each tracking unit 120 has full functionality. That is, each tracking unit can be used as a locating unit or target unit, and, therefore, can track or be tracked by one or many other tracking units 120, allowing full networked capability amongst numerous tracking units.

It is to be appreciated that the devices described herein, that is, the locating, target and tracking units, may be manufactured as stand-alone devices. Alternatively, the components of these devices may be incorporated into existing devices, such as personal data assistants (PDA's), cellular telephones, and any other suitable wireless devices.

It is to be appreciated that, although the above discussion is directed primarily to a man overboard situation, the present invention is suitable for numerous applications, including land-based situations where tracking individuals, or property, is desired. Exemplary situations where the present invention can be utilized include tracking lost children, hospital patients, individuals under in-house arrest, firefighters, individuals with Alzheimer's disease, and valuable assets.

The use of a sensor such as an accelerometer in a tracking system can have many uses. For example, the tracking system can intelligently detect a fall, accident, etc. of an individual wearing a tracking system unit. Thus, a tracking system unit worn by a first person, e.g., a skier, snow machine operator, rock climber, etc., can send a signal to a second person indicating that the first person could be in danger. Additionally, the use of an accelerometer in conjunction with a GPS based receiver can be used to monitor individuals in situations where the individual's access to the GPS signals is compromised. For example, if a person walks into a building, cave, or other confined space, and loses reception of GPS signals, dead reckoning can be used in conjunction with data from the accelerometer to track the location of the individual as they travel throughout the area where the GPS signal is not received. This is much more accurate than simply noting the "last known position" of the individual.

In light of the foregoing disclosure of the invention and description of the preferred embodiments, those skilled in this area of technology will readily understand that various modifications and adaptations can be made without departing from the scope and spirit of the invention. All such modifications and adaptations are intended to be covered by the following claims.

What is claimed is:

1. A tracking system comprising, in combination:
 a target unit having a GPS receiver, a signal transmitter to send a signal including a position of the target unit, and a processor to calculate an optimal time interval for transmission of the signal; and
 a locating unit having a GPS signal receiver, a compass to provide a reference direction of the locating unit, a signal receiver to receive the signal sent by the transmitter of the target unit, a processor to calculate a range and bearing from the locating unit to the target unit, and an indicator to display the range and bearing.

2. The tracking system of claim 1, further including a sensor to detect motion of the target unit, the processor of the target unit calculating the optimal time interval based on motion of the target unit.

3. The tracking system of claim 2, wherein the sensor is an accelerometer.

4. The tracking system of claim 1, wherein the processor of the locating unit calculates a confidence level attributed to the signal sent by the target unit.

5. The tracking system of claim 4, wherein the confidence level is displayed by the indicator as a percentage.

6. The tracking system of claim 1, wherein the processor of the target unit calculates a confidence level to indicate a reliability of the signal sent by the target unit.

7. The tracking system of claim 1, wherein the indicator displays an arrow showing the bearing from the locating unit to the target unit, and the range from the locating unit to the target unit.

8. The tracking system of claim 1, wherein the indicator includes a graphical display of relative positions of the locating unit and the target unit.

9. The tracking system of claim 1, wherein the signal sent by the transmitter of the target unit is an RF signal.

10. The tracking system of claim 1, wherein the locating unit includes a transmitter and the target unit includes a receiver, the transmitter of the locating unit sending another signal to the receiver of the target unit to provide data regarding the signal sent from the target unit to the locating unit.

11. The tracking system of claim 1, wherein the locating unit includes a speaker to provide the range and bearing via an audible signal.

12. The tracking system of claim 1, further comprising a water detector configured to prompt the signal transmitter to send the signal when the target unit comes in contact with water.

13. The tracking system of claim 1, wherein the signal includes information in addition to the position of the target unit.

14. The tracking system of claim 13, wherein the signal includes data regarding a reliability of the signal sent from the target unit to the locating unit.

15. The tracking system of claim 13, wherein the signal includes an identifier unique to the target unit.

16. The tracking system of claim 13, wherein the signal includes information regarding a path that the target unit has traveled over a selected period of time.

17. The tracking system of claim 16, wherein the information regarding the path includes velocity and direction information.

18. The tracking system of claim 13, wherein the signal includes data regarding a projected path of the target unit.

19. The tracking system of claim 13, wherein the signal includes a predetermined test signal known by the locating unit.

20. The tracking system of claim 1, further including an accelerometer to detect motion of the locating unit.

21. A tracking system comprising, in combination:
    a target unit having a GPS receiver, and a signal transmitter to send a signal including a position of the target unit; and
    a locating unit having
        a GPS signal receiver,
        a compass to provide a reference direction of the locating unit,
        a signal receiver to receive the signal sent by the transmitter of the target unit,
        a processor to calculate a range and bearing from the locating unit to the target unit and a confidence level attributed to the signal sent by the target unit, and
        an indicator to display the range, bearing and confidence level.

22. The tracking system of claim 21, wherein the confidence level is displayed as a percentage.

23. The tracking system of claim 21, wherein the indicator displays an arrow showing the bearing from the locating unit to the target unit, and the range from the locating unit to the target unit.

24. The tracking system of claim 21, wherein the indicator includes a graphical display of relative positions of the locating unit and the target unit.

25. The tracking system of claim 21, wherein the locating unit includes a speaker to provide the range and bearing via an audible signal.

26. The tracking system of claim 21, further comprising a processor to calculate an optimal time interval for transmission of the signal.

27. The tracking system of claim 26 further including a sensor to detect motion of the target unit, the processor of the target unit calculating the optimal time interval based on motion of the target unit.

28. The tracking system of claim 27, wherein the sensor is an accelerometer.

29. The tracking system of claim 21, further comprising a water detector configured to prompt the signal transmitter to send the signal when the target unit comes in contact with water.

30. The tracking system of claim 21, wherein the signal includes information in addition to the position of the target unit.

31. The tracking system of claim 30, wherein the signal includes an identifier unique to the target unit.

32. The tracking system of claim 30, wherein the signal includes information regarding a path that the target unit has traveled over a selected period of time.

33. The tracking system of claim 32, wherein the information regarding the path includes velocity and direction information.

34. The tracking system of claim 30, wherein the signal includes data regarding a projected path of the target unit.

35. The tracking system of claim 30, wherein the signal includes a predetermined test signal known by the locating unit.

36. The tracking system of claim 21, further including an accelerometer to detect motion of the locating unit.

37. A system to transmit the location of an object or individual associated with the system comprising, in combination:
    a GPS receiver to determine a position of a device;
    a signal transmitter to send a signal including the position of the device; and
    a processor to calculate an optimal time interval for transmission of the signal.

38. The system of claim 37, further including a sensor to detect motion of the device, the processor calculating the optimal time interval based on the motion of the device.

39. The system of claim 38, wherein the sensor is an accelerometer.

40. The system of claim 37, wherein the processor calculates a confidence level attributed to the signal.

41. The system of claim 37, wherein the signal sent by the transmitter is an RF signal.

42. The system of claim 37, wherein the signal includes information in addition to the position of the device.

43. The system of claim 42, wherein the signal includes an identifier unique to that transmitter.

44. The system of claim 42, wherein the signal includes data regarding a reliability of the signal.

45. The tracking system of claim 42, wherein the signal includes information regarding a path that the target unit has traveled over a selected period of time.

46. The tracking system of claim 45, wherein the information regarding the path includes velocity and direction information.

47. The tracking system of claim 42, wherein the signal includes data regarding a projected path of the target unit.

48. The tracking system of claim 42, wherein the signal includes a predetermined test signal known by the locating unit.

49. The system of claim 37, further comprising a water detector configured to prompt the signal transmitter to send the signal when the target unit comes in contact with water.

50. A tracking system to track the location of an object in water comprising, in combination:
    a target unit having a GPS receiver to determine a position of the target unit, a sensor to detect motion of the target unit, a processor to calculate when the target unit is proximate a crest of a wave, a signal transmitter to send a signal including the position of the target unit when the target unit is proximate a crest of a wave; and a locating unit having a GPS signal receiver, a compass to provide a reference direction of the locating unit, a signal receiver to receive the signal sent by the transmitter of the target unit, a processor to calculate a range and bearing from the locating unit to the target unit, and an indicator to display the range and bearing.

51. The tracking system of claim 50, wherein the sensor includes an accelerometer.

52. The tracking system of claim 50, wherein the processor of the locating unit calculates a confidence level attributed to the signal sent from the target unit to the locating unit.

53. The tracking system of claim 52, wherein the confidence level is displayed by the indicator as a percentage.

54. The tracking system of claim 50, wherein the target unit includes a water detector that prompts the signal transmitter to send the signal when the target unit comes in contact with water.

55. The tracking system of claim 50, wherein the signal includes information in addition to the position of the target unit.

56. The tracking system of claim 55, wherein the signal includes an identifier unique to the target unit.

57. The tracking system of claim 55, wherein the signal includes information regarding a path that the target unit has traveled over a selected period of time.

58. The tracking system of claim 57, wherein the information regarding the path includes velocity and direction information.

59. The tracking system of claim 55, wherein the signal includes data regarding a projected path of the target unit.

60. The tracking system of claim 55, wherein the signal includes a predetermined test signal known by the locating unit.

61. The tracking system of claim 48, further including an accelerometer to detect motion of the locating unit.

62. A method of tracking a target unit from a locating unit comprising the steps of:

receiving a GPS signal at a target unit to determine a location of the target unit;

receiving a GPS signal at a locating unit tracking the target unit to determine a location of the locating unit;

calculating an optimal time interval for transmission of a signal from the target unit to the locating unit, the signal including the GPS location of the target unit;

transmitting the signal from the target unit to the locating unit during the optimal time interval;

calculating a range and bearing from the locating unit to the target unit.

63. The method of claim 62, further comprising the step of displaying the range and bearing from the locating unit to the target unit.

64. The method of claim 62, further comprising the step of calculating a confidence level attributed to the signal sent from the target unit to the locating unit.

65. The method of claim 62, wherein the target unit includes a sensor to detect motion of the target unit and the optimal time interval is calculated based on the motion of the target unit.

66. The method of claim 65, wherein the sensor is an accelerometer.

67. The method of claim 62, wherein the locating unit includes an accelerometer to detect motion of the locating unit.

68. A tracking system comprising, in combination:

a tracking unit having a GPS receiver, a signal transmitter to send a signal including a position of the tracking unit, a signal receiver configured to receive a signal sent by a transmitter of at least another tracking unit, a processor configured to calculate a range and bearing from the tracking unit to at least another tracking unit and a confidence level attributed to a signal sent by at least another tracking unit, a compass to provide a reference direction of the tracking unit, and an indicator configured to display the range and bearing to at least another tracking unit.

69. The tracking system of claim 68, wherein the processor is configured to calculate an optimal time interval for transmission of the signal.

70. The tracking system of claim 68, further including a sensor to detect motion of the tracking unit, the processor calculating an optimal time interval for transmission of a signal based on motion of the tracking unit.

71. The tracking system of claim 70, wherein the sensor is an accelerometer.

72. The tracking system of claim 68, wherein the confidence level is displayed by the indicator as a percentage.

73. The tracking system of claim 68, wherein the indicator is configured to display an arrow showing the bearing from the tracking unit to at least another tracking unit, and a range from the locating unit to at least another tracking unit.

74. The tracking system of claim 68, wherein the indicator is configured to include a graphical display of relative positions of the tracking unit and at least another tracking unit.

75. The tracking system of claim 68, wherein the tracking unit includes a speaker to provide the range and bearing via an audible signal.

76. The tracking system of claim 68, further comprising a water detector configured to prompt the signal transmitter to send the signal when the tracking unit comes in contact with water.

77. The tracking system of claim 68, wherein the signal includes data regarding a reliability of the signal sent by the tracking unit.

78. The tracking system of claim 68, wherein the signal includes an identifier unique to the tracking unit.

79. The tracking system of claim 68, wherein the signal includes information regarding a path that the tracking unit has traveled over a selected period of time.

80. The tracking system of claim 79, wherein the information regarding the path includes velocity and direction information.

81. The tracking system of claim 68, wherein the signal includes data regarding a projected path of the tracking unit.

82. The tracking system of claim 68, wherein the signal includes a predetermined test signal.

\* \* \* \* \*